(12) United States Patent
Brenes et al.

(10) Patent No.: US 7,475,299 B1
(45) Date of Patent: Jan. 6, 2009

(54) METHOD AND SYSTEM FOR REAL-TIME BIT ERROR RATIO DETERMINATION

(75) Inventors: Manrique J. Brenes, Corona del Mar, CA (US); Yen T. Nguyen, Austin, TX (US)

(73) Assignee: Cisco Technology Inc., San Jose, CA (US)

( * ) Notice: Subject to any disclaimer, the term of this patent is extended or adjusted under 35 U.S.C. 154(b) by 410 days.

(21) Appl. No.: 10/773,705

(22) Filed: Feb. 6, 2004

(51) Int. Cl.
  *H04L 1/20* (2006.01)
(52) U.S. Cl. .................................................. 714/704
(58) Field of Classification Search ................ 714/704, 714/708
  See application file for complete search history.

(56) References Cited

U.S. PATENT DOCUMENTS

| | | | | |
|---|---|---|---|---|
| 3,916,379 A * | 10/1975 | Dulaney et al. | ............. | 714/704 |
| 3,983,340 A * | 9/1976 | Lima et al. | ...................... | 379/2 |
| 3,991,278 A * | 11/1976 | Fang et al. | .................. | 370/227 |
| 4,291,403 A * | 9/1981 | Waddill et al. | .............. | 714/704 |
| 4,328,577 A * | 5/1982 | Abbott et al. | ................ | 370/228 |
| 4,363,123 A * | 12/1982 | Grover | ........................ | 377/28 |
| 4,713,810 A * | 12/1987 | Chum | ......................... | 714/25 |
| 4,800,562 A * | 1/1989 | Hicks | .......................... | 714/704 |
| 4,809,298 A * | 2/1989 | Sakane et al. | ............... | 375/286 |
| 4,920,537 A * | 4/1990 | Darling et al. | .............. | 714/704 |
| 5,305,323 A * | 4/1994 | Lada | ........................... | 714/704 |
| 5,331,642 A * | 7/1994 | Valley et al. | ................ | 714/705 |
| 5,394,145 A * | 2/1995 | Gupta et al. | ................... | 341/73 |
| 5,459,731 A * | 10/1995 | Brief et al. | ................... | 714/704 |
| 5,784,377 A * | 7/1998 | Baydar et al. | ............... | 370/463 |
| 6,006,019 A * | 12/1999 | Takei | ......................... | 709/224 |
| 6,067,646 A * | 5/2000 | Starr | .......................... | 714/701 |
| 6,073,257 A * | 6/2000 | Labonte et al. | ............. | 714/704 |
| 6,307,899 B1* | 10/2001 | Starr et al. | ................... | 375/340 |
| 6,310,911 B1* | 10/2001 | Burke et al. | ................. | 375/224 |
| 6,490,461 B1* | 12/2002 | Muller | ........................ | 455/522 |
| 6,591,383 B1* | 7/2003 | Michel et al. | ............... | 714/704 |
| 6,603,822 B2* | 8/2003 | Brede et al. | ................. | 375/340 |
| 6,690,884 B1* | 2/2004 | Kelty et al. | .................... | 398/27 |
| 6,707,550 B1* | 3/2004 | Georgis et al. | ............. | 356/326 |
| 6,801,570 B2* | 10/2004 | Yong | .......................... | 375/219 |
| 6,850,498 B2* | 2/2005 | Heath et al. | ................. | 370/328 |
| 6,961,348 B2* | 11/2005 | Yu | .............................. | 370/466 |
| 6,988,227 B1* | 1/2006 | Perrott | ....................... | 714/704 |
| 7,016,297 B2* | 3/2006 | Tang et al. | ................... | 370/204 |
| 7,058,027 B1* | 6/2006 | Alessi et al. | ............. | 370/310.1 |
| 7,076,274 B2* | 7/2006 | Jollota et al. | ................. | 455/561 |
| 7,079,550 B2* | 7/2006 | Padovani et al. | ............ | 370/468 |
| 7,080,294 B1* | 7/2006 | Weber | ........................ | 714/704 |
| 7,082,299 B2* | 7/2006 | Lemieux et al. | ............. | 455/425 |
| 7,106,791 B2* | 9/2006 | Chen et al. | ................... | 375/224 |
| 7,106,965 B2* | 9/2006 | Suzuki | ........................ | 398/31 |
| 7,164,710 B2* | 1/2007 | Komaili et al. | .............. | 375/229 |
| 7,187,646 B2* | 3/2007 | Schramm | .................... | 370/206 |
| 7,239,847 B2* | 7/2007 | Attar et al. | ................. | 455/63.1 |
| 2005/0132258 A1* | 6/2005 | Chen et al. | .................. | 714/704 |

* cited by examiner

*Primary Examiner*—Stephen M Baker
(74) *Attorney, Agent, or Firm*—Campbell Stephenson LLP

(57) ABSTRACT

A method and system for real-time bit error ratio determination is disclosed. According to one embodiment, a method is provided in which an operational link error rate of a link is determined and then used to estimate a real-time physical link error rate of the link. In another embodiment, the operational link error rate is determined in response to the detection of an operational link error using a cyclic redundancy check.

29 Claims, 6 Drawing Sheets

METHOD AND SYSTEM FOR REAL-TIME BIT ERROR RATIO DETERMINATION

BACKGROUND OF THE INVENTION

1. Field of the Invention

This invention relates generally to communications and more particularly to a method and system for real-time bit error ratio determination.

2. Description of the Related Art

In conventional communications networks, it has become increasingly important to be able to determine the accuracy with which data is transmitted. Attempts have been made to identify bit error occurrences in a number of networks, particularly those transporting critical and/or time sensitive data, in order to alert users and/or applications and avoid further error and damage. For example, in automation control networks used in the operation of manufacturing and process equipment. Failures in such networks (e.g., in motion control, process, or manufacturing operation processes) have safety and financial implications that are frequently more serious than failures in other data networks (e.g., file sharing, e-mail, or the like).

As Ethernet and other traditional networking layer 2 (L2) technologies have become prevalent in time-sensitive applications and communications networks, techniques to determine bit error occurrences in such environments have become more and more important. Traditionally, systems for identifying errors in such environments have implemented either "dedicated link" or "in place" monitoring systems. In "dedicated link" monitoring systems, physical test equipment is place at either end (e.g., transmit and receive) or a link within a communications network. A known sequence or bits is then transmitted across the link so that a definitive determination about any individual bit errors may be made. Unfortunately such "dedicated link" systems require specialized hardware for each link of a network and typically do not provide the capability to utilize the monitored link or network for ordinary data transmission while monitoring is being performed.

By contrast, "in place" monitoring systems or techniques use error detection techniques such as cyclic redundancy check (CRC) parity to determine the number of packet or frame errors occurring over a link. While "in place" monitoring systems allow links to be used for data transmission during monitoring, and do not require that the specific sequence of bits transmitted be known prior to transmission, they require that an entire packet or frame be transmitted and fail to provide information about individual bit errors.

SUMMARY OF THE INVENTION

A method and system for real-time bit error ratio determination is disclosed. According to one embodiment, a method is provided in which an operational link error rate of a link is determined and then used to estimate a real-time physical link error rate of the link. In another embodiment, the operational link error rate is determined in response to the detection of an operational link error using a cyclic redundancy check.

In another embodiment, an apparatus is provided which includes a monitoring subsystem and an alarm subsystem. In the described embodiment, the monitoring subsystem can be used to determine an operational link error rate of a link and to estimate a real-time physical link error rate of the link using the operational link error rate. The alarm subsystem of the described embodiment can be used to generate an alarm signal in response to a comparison of the real-time physical link error rate and a physical link error alarm set threshold.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings in which.

The use of the same reference symbols in different drawings indicates similar or identical items.

DETAILED DESCRIPTION

Embodiments of the present invention provide a method and system for real-time bit error ratio determination. By analyzing the data rate of a network and the required bit-error rate of one or more data link layer protocols associated with the network, the relationship between operational link or "packet" errors and physical link errors may be determined. Consequently, a real-time physical link error rate may be determined using an operational link error rate.

Figure 1A:
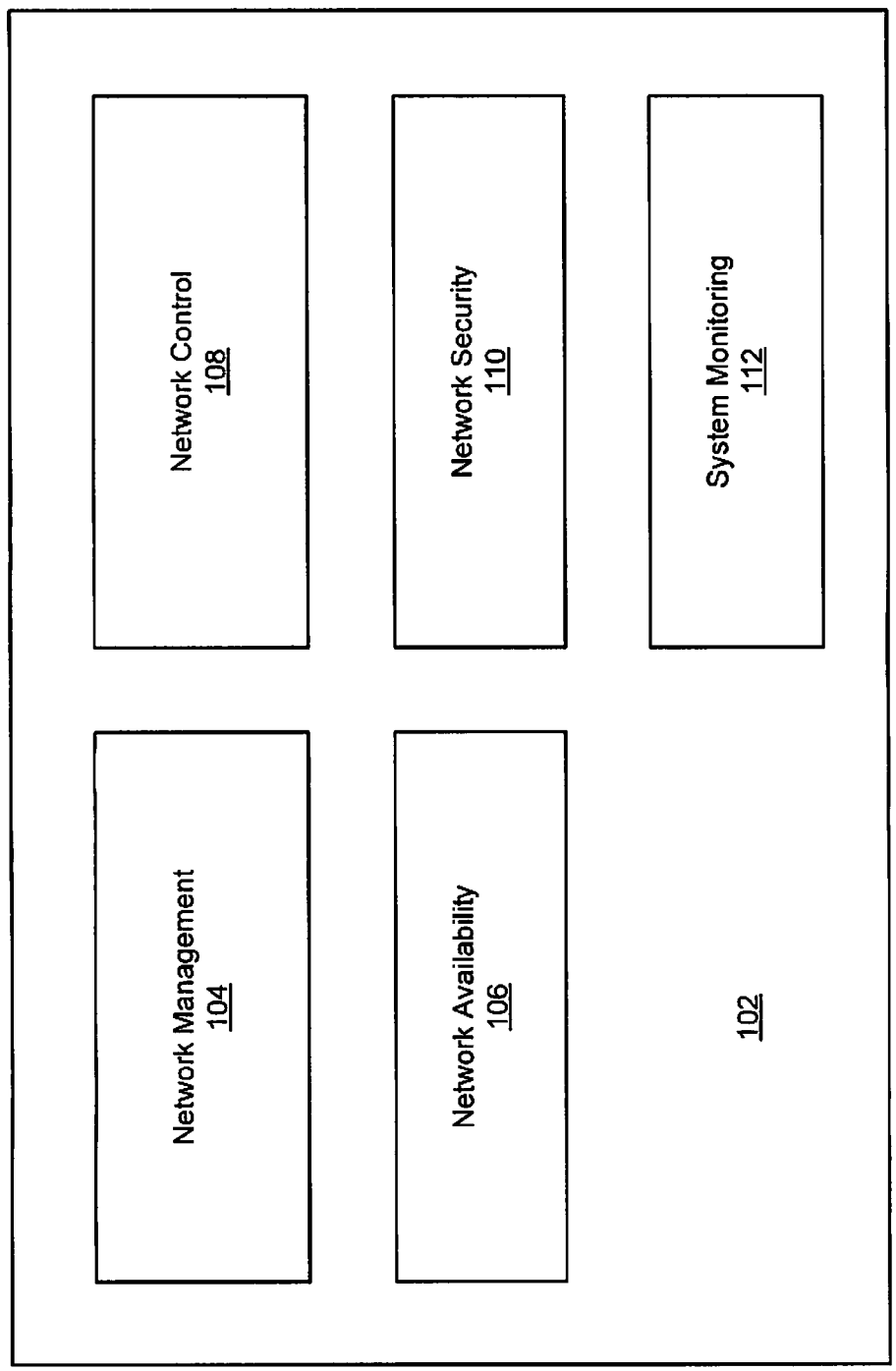
FIG. 1A illustrates a functional block diagram of the a network element according to an embodiment of the present invention.

FIG. 1A illustrates a functional block diagram of a network element according to an embodiment of the present invention. Network element 102 (e.g., an Ethernet switch, router, or the like) of FIG. 1A includes a number of functional groups or "modules" which can implement or support, in one or more embodiments, any of a number of features and/or protocols such as the spanning tree protocol, rapid spanning tree protocol, VLAN query protocol, dynamic trunk protocol, port aggregation protocol, network time protocol, Simple Network Management Protocol, or the like.

In one embodiment, functions corresponding to the described modules are programmed in software or firmware stored on a machine-readable media (e.g., magnetic floppy disks, hard disks, or optical discs such as CD-ROMs or CD-Rs, semiconductor-based memory, or the like) which is executable by a processor of network element 102. In the illustrated embodiment of FIG. 1A, such modules include, but are not limited to, a network management module 104, a network availability module 106, a network control module 108, a network security module 110, and a system monitoring module 112. These modules may be implemented within a network element in any of a variety of environments and according to one embodiment, are implemented within an industrial Ethernet switch.

Within the illustrated embodiment of FIG. 1A, network management module 104 is used to perform management functions associated with a communications network to which network element 102 is coupled, network availability module 106 provides functionality associated with maintaining efficient use of resources for bandwidth-intensive applications (e.g., multicast), and network control module 108 provides functionality for classifying, prioritizing and avoiding congestion in network traffic. According to one embodiment of the present invention, network control module 108 is operable to classify, reclassify, police, and mark or drop incoming packets before each packet is placed into a shared buffer. Packet classification allows network elements to discriminate between various traffic flows in enforced policies based on a layer 2 and/or layer 3 QoS field. To implement QoS, network control module 108 identifies traffic flows, or packet groups, and classifies or reclassifies these groups (e.g., using the DSCP field for IP packets and/or the 802.1 P class of service field for Ethernet packets). Classification and reclassification can also be based on criteria as specific as the source/destination IP address, source/destination MAC address, or TCP/UDP ports. At the ingress level, network control module 108 may also be used to perform policing and marking of the packet.

After the packet goes through classification, policing, and marking, it is then assigned to the appropriate queue before exiting the switch. In one embodiment, four egress queues per port are supported, allowing the network administrator to be more discriminating and specific in assigning priorities for the various applications on the LAN. At the egress level, network control module 108 performs scheduling to determine the order in which the described queues are processed. Weighted round-robin scheduling, strict priority scheduling, or other scheduling approaches can be utilized in alternative embodiments. Weighted round-robin scheduling assures that lower priority packets are not entirely starved for bandwidth and are serviced without compromising the priority settings administered by the network manager. Strict priority scheduling ensures that the highest priority packets are serviced first out of all other traffic, and that the queues will be serviced using weighted round-robin best effort.

Thus network control module 108 allows network administrators to prioritize applications having critical and/or bandwidth-intensive traffic over less time-sensitive applications such as FTP or e-mail. For example, it would be highly undesirable to have a large file download destined to one port or a wiring closet switch and consequently to have quality implications such as increased latency in voice or control traffic, destined to another port on this switch. This condition is weighed by ensuring that latency-sensitive or critical traffic is properly classified and prioritized throughout the network. Other applications, such as web browsing, can be treated as low priority and handled on a best-effort basis.

Network control module 108 is operable to allocate bandwidth based on several criteria (e.g., MAC source address, MAC destination address, IP source address, IP destination address, and TCP/UDP port number). Bandwidth allocation may be particularly relevant in network environments requiring service-level agreements or when it is necessary for the network manager to control the bandwidth given to certain users.

Network security module 110, within the illustrated embodiment of FIG. 1A, provides functionality associated with network security. In one embodiment, network security module 110 offers enhanced data security through a wide range of security features. Network security module 110 allows customers to enhance LAN security with capabilities to secure network management traffic through the protection of passwords and configuration information; to provide options for network security based on users, ports, and MAC addresses; and to enable more immediate reactions to intruder and hacker detection. Network element 102 of the described embodiment also includes a system monitoring module 112 which is used to monitor various aspects of the network element further described herein.

Figure 1B:
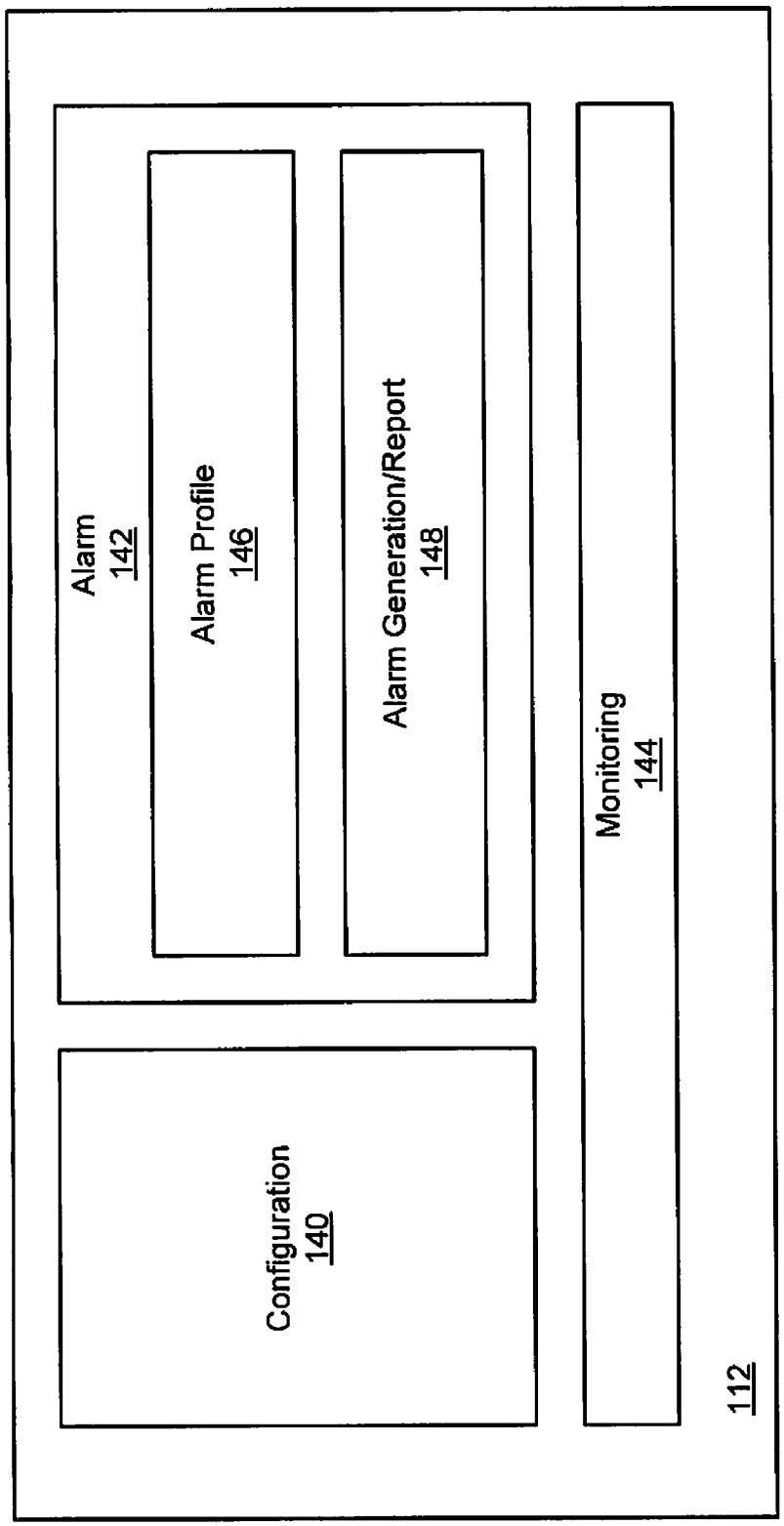
FIG. 1B illustrates a block diagram of a system monitoring module of FIG. 1A according to an embodiment of the present invention.

FIG. 1B illustrates a block diagram of system monitoring module 112 of FIG. 1A according to an embodiment of the present invention. System monitoring module 112 in the illustrated embodiment includes a configuration subsystem 140, an alarm subsystem 142, and a monitoring subsystem 144. Configuration subsystem 140 allows a user to specify which of a plurality of fault conditions for which the user wishes an alarm to be generated. Details of one example embodiment of configuration subsystem 140 are provided in conjunction with FIG. 1C. Monitoring subsystem 144 monitors network element 102 for each of a plurality of configured fault conditions. If a particular fault condition is detected, the signal is provided to alarm subsystem 142. Details of one example of monitoring subsystem 144 are provided in conjunction with FIG. 3.

Alarm subsystem 142 uses an indication of a fault condition from monitoring system 144 and, in response, generates an alarm signal that is provided to a relay connected to an actual alarm. The alarm may be generated such that a user is informed of the fault condition. Alarm subsystem 142 may include an alarm profile module 146 and an alarm generation/report module 148. Alarm profile module 146 updates alarm profiles for which alarms are enabled and/or disabled through configuration block 140. Alarm generation/report module 148 executes enabled alarms in response to a signal received from monitoring subsystem 144. Additional details of one embodiment of alarm subsystem 142 are described in greater detail in conjunction with FIGS. 4a and 4b.

Figure 1C:
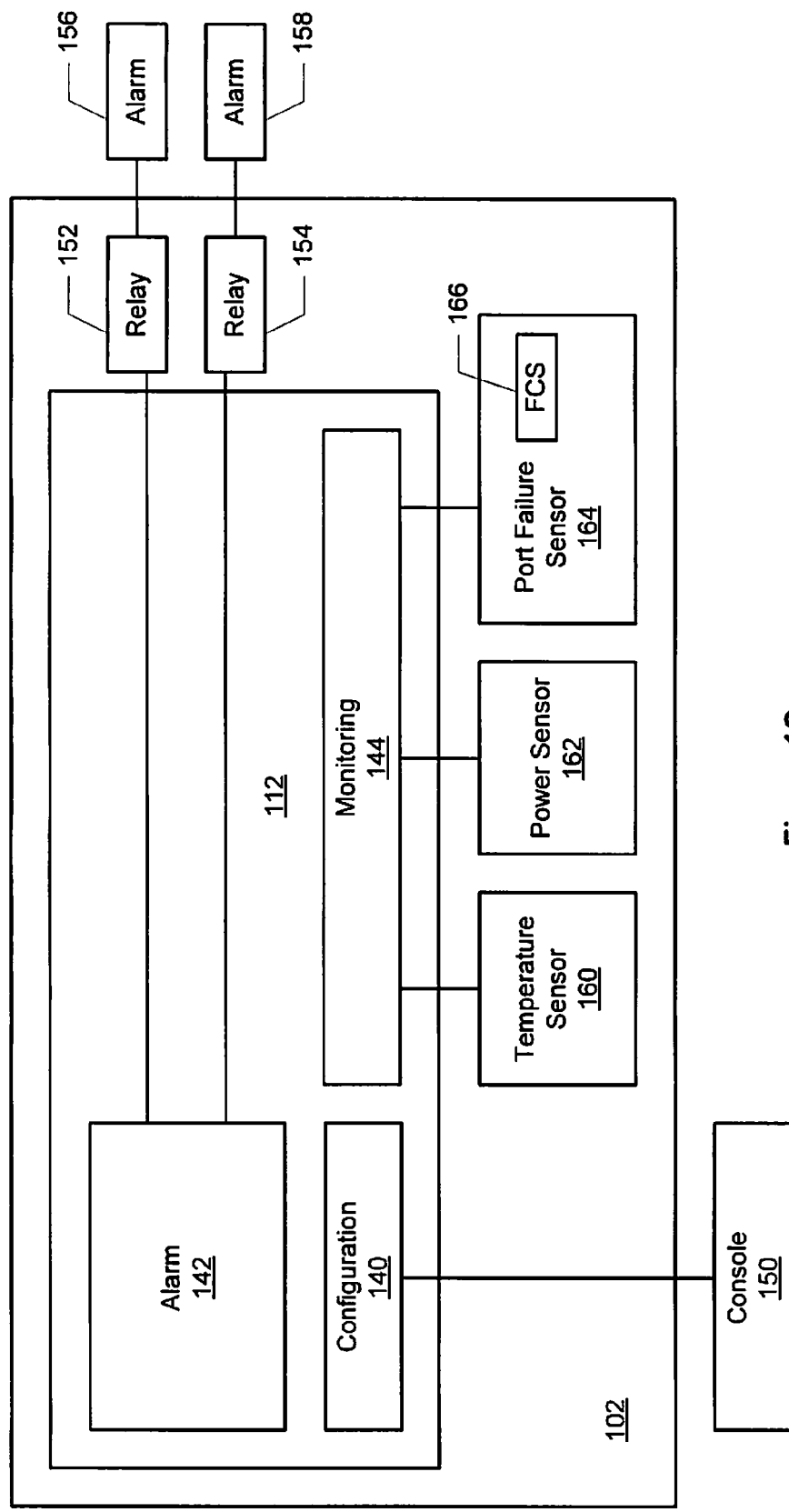
FIG. 1C illustrates a block diagram showing portions of the system monitoring module of FIG. 1B in conjunction with associated hardware according to an embodiment of the present invention.

FIG. 1C illustrates a block diagram showing portions of the system monitoring module of FIG. 1B in conjunction with associated hardware according to an embodiment of the present invention. As illustrated, configuration subsystem 140 may be coupled to a console 150. Console 150 may be a personal computer, terminal, or other device which allows data to be received by or input to network element 102. In this manner, a user may specify particular fault conditions to configure system monitoring module 112. Also illustrated are relays 152 and 154 coupled to alarm subsystem 142. Relays 152 and 154 may be any suitable relay that is operable to receive a signal and in response activate or "turn on" an associated alarm. Although alarms 156 and 158 are depicted as external to system monitoring module 112 and network element 102, any number of relays may be included within network element 102 or monitoring module 112 in an alternative embodiment.

A temperature sensor 160, a power sensor 162, and a port failure sensor 164 are illustrated as being coupled to monitoring subsystem 144. Port failure sensor 164 provides information to monitoring subsystem 144 regarding pre-defined port conditions and in the illustrated embodiment of FIG. 1C, includes a frame check sequence (FCS) error sensor 166. Temperature sensors 160 and power sensor 162 may be formed internal to network element 102, or may be external sensors, and may take any suitable form which allows measurement of temperature and power, respectively.

Figure 2:
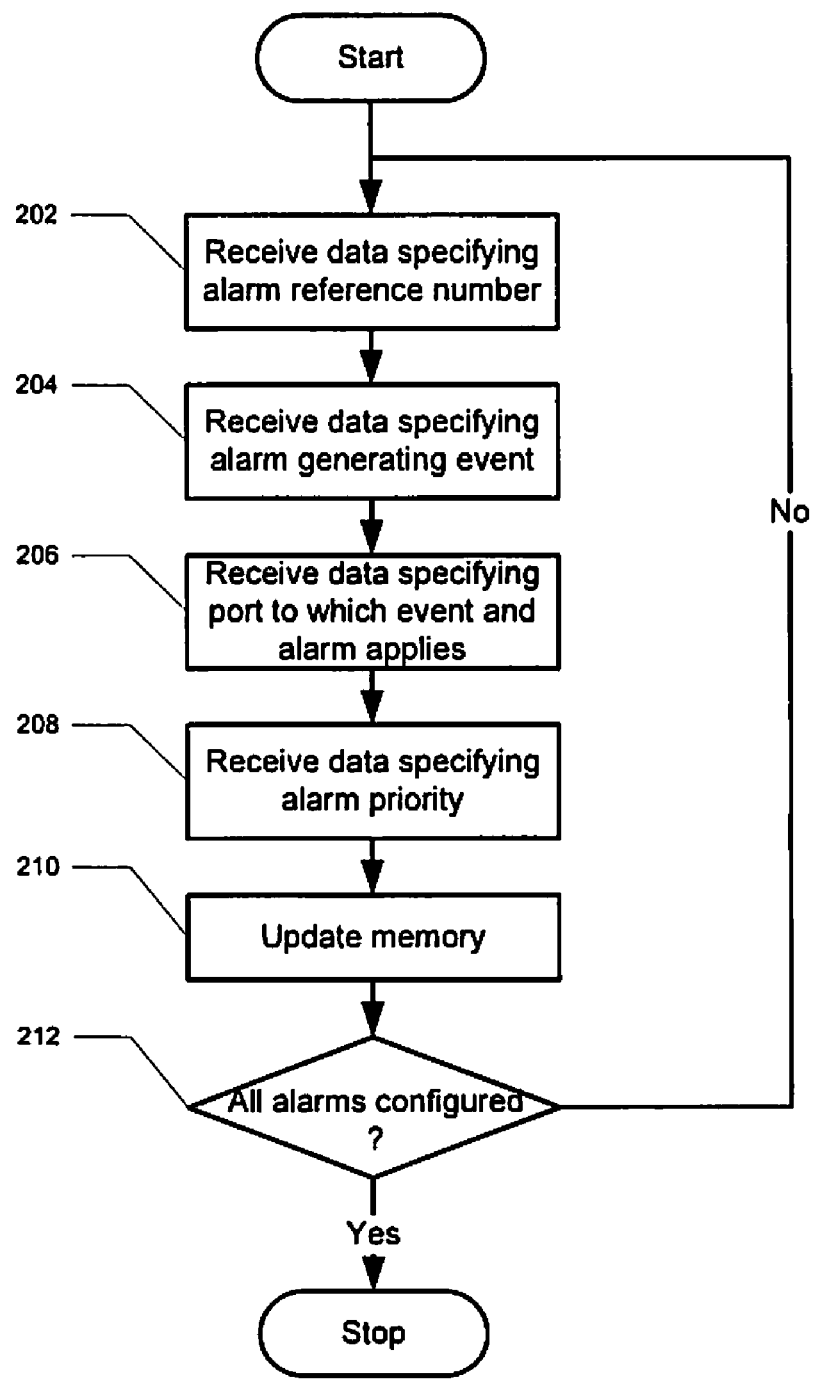
FIG. 2 illustrates a process flow diagram of a process for configuring alarms within a network element according to an embodiment of the present invention.

FIG. 2 illustrates a process flow diagram of a process for configuring alarms within a network element according to an embodiment of the present invention. While a particular order and number of process flowchart elements has been illustrated in the embodiment of FIG. 2, it should be appreciated that a greater or lesser number of process elements may be used and that the illustrated order may not necessarily be required. For example, in alternative embodiments of the present invention one or more process operations may be performed simultaneously or in parallel. According to one embodiment of the present invention, the illustrated method of FIG. 2 is implemented by configuration subsystem 140 of system monitoring module 112, or by other software or machine-executable instructions stored on network element 102. In the illustrated embodiment, data specifying an alarm reference number is initially received (process block 202) (e.g., from a user operating console 360, or through other suitable techniques). In the illustrated process embodiment, an alarm reference number is associated with a particular one of a plurality of possible alarms corresponding to all fault conditions for which detection is sought.

Thereafter data specifying an alarm-generating event is received (process block 204). According to the illustrated embodiment, alarm-generating events may be categorized as physical link errors or operational link errors. Physical link errors or faults are associated with errors or faults with the physical layer portion of a communications network associated with a network element such as network element 102. Examples of physical link errors include, but are not limited to, loss of signal, clock, or physical connection. Operational link errors indicate errors or faults within received frames or packets. Examples of operational link errors include, but are not limited to, cyclic redundancy check (CRC)/frame check sequence (FCS) errors, alignment errors, and jabber errors. These possible errors are provided for example purposes only, and other errors or faults may be specified. According to one embodiment, an indication is provided to the user of each of these faults and the user is queried as to whether any one of these should generate a fault condition.

Thereafter, data is received which indicates the ports to which the condition that will generate an alarm applies (process block 206). Thus, each of the specified conditions may be applied to selected ports rather than all ports at once. Data is then received specifying a priority for the indicated alarm-generating event (process block 208). According to one embodiment, a priority may be high or low, depending on the severity of the fault condition or error. According to other embodiments, more than two priorities may be specified. Once the described data has been received as described, the data is updated in memory for an associated alarm-generating event or condition (process block 210). According to one embodiment, the described memory is accessible by an alarm subsystem such as alarm subsystem 142 described herein. Following the illustrated memory update, a determination is made as to whether or not all alarms (e.g., all possible or desired alarms or fault conditions) have been configured (process block 212).

Figure 3:
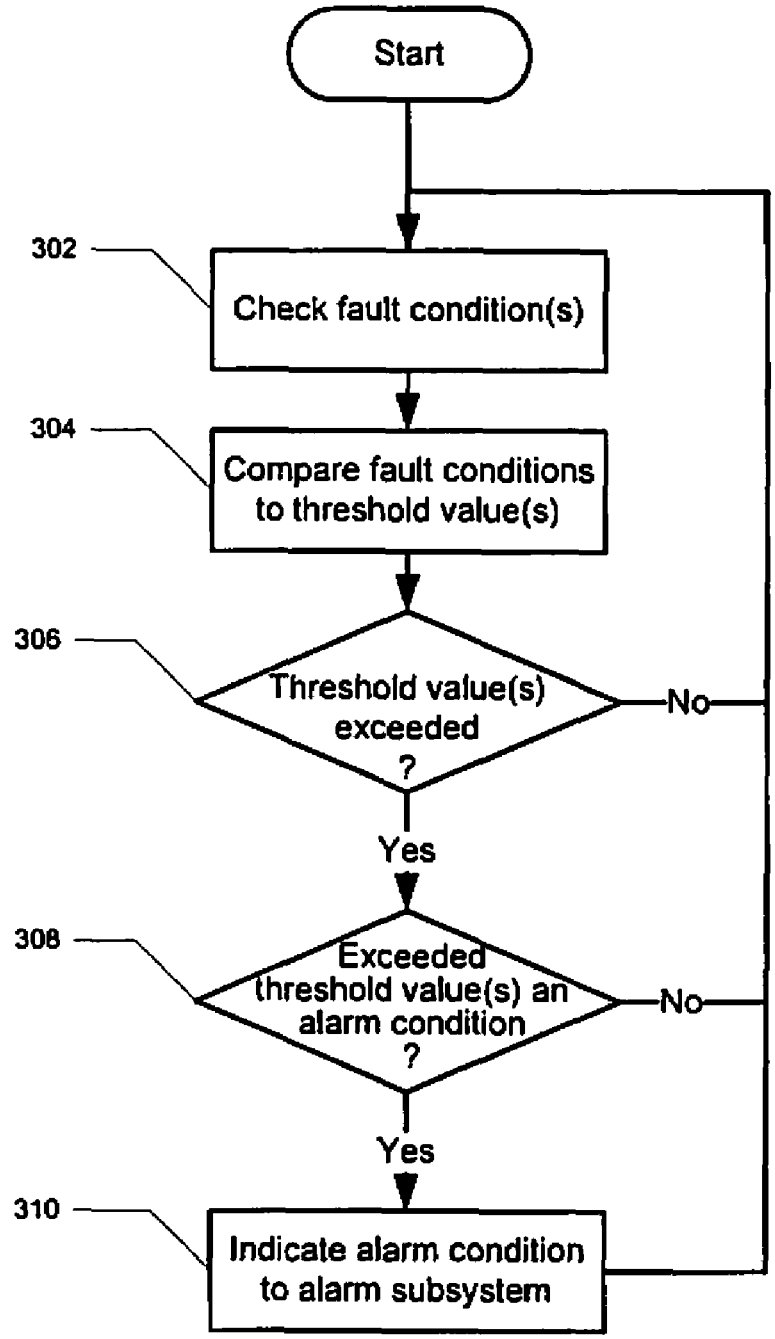
FIG. 3 illustrates a process flow diagram of a process for monitoring fault conditions associated with a network element according to an embodiment of the present invention.

FIG. 3 illustrates a process flow diagram of a process for monitoring fault conditions associated with a network element according to an embodiment of the present invention. In the illustrated process embodiment, a plurality of possible fault conditions are initially checked (process block 302). According to one embodiment, the described fault condition check operation(s) are performed periodically. Thereafter, a particular fault parameter is compared to a predetermined or threshold value (process block 304). A determination is then made whether the current fault condition exceeds acceptable levels (process block 306). If the current fault or error condition exceeds a threshold level, a determination is then made (process block 308) whether or not the fault condition should generate an alarm. This determination is based upon whether the fault condition has been configured to generate an alarm, as described herein. An indication is then provided (if it is determined both that the described fault or error parameters exceed predetermined threshold values and that the fault condition has been configured to generate an alarm signal) to an alarm subsystem for handling the alarm. If particular measured values do not exceed fault thresholds however or a determination is made that the fault condition being examined is not configured to generate an alarm, the illustrated process restarts as all conditions are checked as previously described. In an alternative embodiment, only fault conditions that are configured by the user to generate alarms are checked, and consequently no determination (process block 308) is made as to whether or not such a configuration has occurred.

Figure 4B:
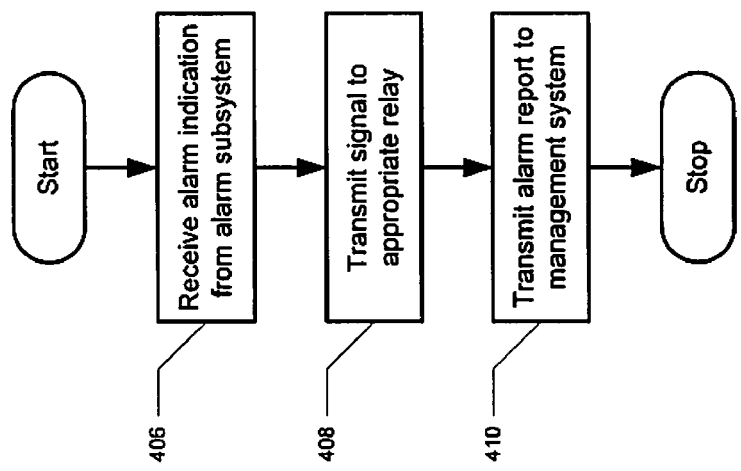
FIG. 4B illustrates a process flow diagram of a process for initiating an alarm in response to a detected fault condition according to an embodiment of the present invention.
Figure 4A:
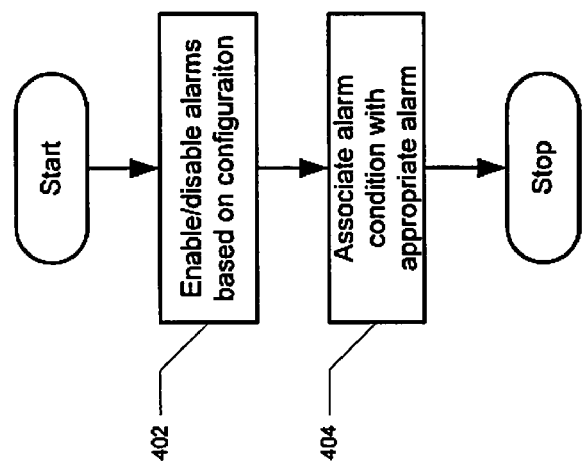
FIG. 4A illustrates a process flow diagram of a process for enabling or disabling alarms according to an embodiment of the present invention.

FIG. 4A illustrates a process flow diagram of a process for enabling or disabling alarms according to an embodiment of the present invention. According to one embodiment of the present invention, the illustrated process may be executed by an alarm profile module (e.g., alarm profile module 146), or through other suitable software on a network element such as network element 102. In the illustrated process embodiment, particular alarms are enabled or disabled based upon one or more configuration operations performed as previously described herein (process block 402). Thereafter, specific alarms are associated with specific alarm conditions or alarm-generating events (e.g., fault conditions, errors, or the like). The described association may involve matching particular alarms with the priority level designated for the particular fault condition. For example, a power failure fault may correspond to turning on a red light, where a port not forwarding fault may correspond to turning on a blue light. Thus, according to the teachings of the invention, different levels of severity of conditions may be indicated to a user by differentiation in the alarms. It will be understood that other techniques may be utilized for differentiating alarms such as different sounds or other visual indications. Furthermore, it will be understood that the use of two alarms may provide new data bits for which four different levels of priority may be utilized.

FIG. 4B illustrates a process flow diagram of a process for initiating an alarm in response to a detected fault condition according to an embodiment of the present invention. According to one embodiment, the illustrated method may be performed by alarm generation/report module (e.g., alarm generation/report module 148) or by other network element programming. In the illustrated process embodiment, an indication is received (e.g., from monitoring subsystem 144) of a need for an alarm (process block 406) which corresponds to a detected fault condition for which a user has configured an alarm. Subsequently, a signal is transmitted to a relay connected to the alarm associated with the particular fault condition (process block 408). Consequently, the described relay may activate a particular alarm associated with the particular fault condition. Thereafter, an alarm report specifying details of the fault condition may be sent to a management system, (e.g., console 140 or an SNMP server).

According to one embodiment of the present invention, a method is provided of estimating a real-time physical link error rate (e.g., a bit error rate) of a link between network elements within a communications network. The estimated real-time physical link error rate is then compared to one or more threshold values (e.g., a "physical link error alarm set threshold" and a "physical link error alarm clear threshold"), and an alarm signal is set or cleared in response thereto. A command line interface (CLI) is provided through which one or more parameters are provided. According to one embodiment, a user provides data specifying a link error alarm set threshold and a hysteresis factor using the described command line interface. In one embodiment, for example, a user enters positive integers corresponding to the hysteresis factor and the exponent of a link error alarm set threshold (e.g., '9' for a link error alarm set threshold of $10^{-9}$). According to one embodiment of the present invention, a link error alarm set threshold of between $10^{-6}$ and $10^{-11}$ may be specified in this manner. In alternative embodiments of the present invention, data specifying parameters other than the link error alarm set threshold and hysteresis factor may be provided such that remaining required parameter(s) may be determined.

Within the context of the described embodiment, "hysteresis" is the ratio of the physical link error alarm clear threshold to the physical link error alarm set threshold expressed as a percentage (e.g., a hysteresis of 0.05 is expressed as 5% or the integer 5). Consequently, a "hysteresis factor", used within the context of embodiments of the present invention, is the ratio of the physical link error alarm set threshold to the physical link error alarm clear threshold or 100 divided by the hysteresis. This hysteresis factor is used to provide a delay such that an alarm signal is not continually set and cleared in response to the described comparison operations. In other words, the hysteresis factor is used to establish a range of physical link error rate values between the set and clear thresholds which neither set nor clear an alarm signal, but merely maintain its current state. According to one embodiment, a default hysteresis factor (e.g., 10%) may be used as an initial value or when no hysteresis factor is provided using the command line interface.

Based on the received link error rate alarm set threshold, hysteresis factor, and the transmission bit rate of the link being analyzed, the physical link error alarm clear threshold, physical link error alarm set threshold, and an evaluation time period or "window" are determined. The evaluation time period is the amount of time during which data transmission must be observed in order to ascertain whether or not a particular link error rate threshold has been reached. In other words, the evaluation time period defines the amount of time necessary to be able to correctly set or clear an alamm signal. According to one embodiment, the described parameters are determined using fixed point or "integer" operations rather than floating point and an integer number of seconds is used for the described evaluation time period. In such an embodiment, the described parameters are determined as follows.

Initially, the transmission bit rate of the link is expressed or translated into an integer. For example, where an Ethernet-based network having ports capable of transmission bit rates of 10 Mbps, 100 Mbps, 1000 Mbps, or "auto-speed" is implemented, an integer number between 0 and 2 is used to indicate the transmission bit rate. A '0', '1', or '2' is used to designate transmission bit rates of 10, 100, or 1000 Mbps, respectively, with "auto-speed" ports having a default 10 Mbps transmission bit rate. A bit-rate adjustment factor (e.g., 7 where a 0 is used to designate a transmission bit rate of 10 Mbps) is accordingly used to compensate for the difference between the translated and actual transmission bit rate.

In the described embodiment, the evaluation time period is equal to (or at least closely approximates) the hysteresis factor divided by the product of the link error alarm set threshold and the transmission bit rate. According to one embodiment of the present invention, the exponent of the evaluation time period is determined and used in place of the actual evaluation time period to avoid the use of floating point operations. In the described embodiment, the evaluation time period exponent is calculated as the difference between the exponent of the link error alarm set threshold and the exponent of the compensated transmission bit rate parameter (i.e., the difference between the bit-rate adjustment factor and the integer between 0 and 2 used to express the transmission bit rate).

Once the evaluation time period exponent is determined, it is used to determine and scale as necessary the physical link error alarm set threshold and physical link error alarm clear threshold. Where the evaluation time period exponent is less than zero (e.g., where the evaluation time period is less than one second), the physical link error alarm set and clear thresholds are scaled up (i.e., increased by an appropriate factor). In the described embodiment, a loop is implemented such that the evaluation time period exponent is incremented during each iteration of the loop until it becomes zero and the hysteresis factor is multiplied by ten during each iteration of the loop. Following an execution of the described loop, the value of the hysteresis factor may be used as the physical link error alarm set threshold and a value one less than the value of the hysteresis factor following loop execution divided by the value of the hysteresis factor prior to loop execution may be used as the physical link error alarm clear threshold.

Where the evaluation time period exponent is greater than or equal to zero (e.g., where the evaluation time period is greater than or equal to 1 second), the physical link error alarm set and clear thresholds are similarly scaled as appropriate. In the described embodiment, a loop is implemented such that the evaluation time period is initialized to 1. The time period exponent is then decremented during each iteration of the loop until it becomes zero and the evaluation time period is multiplied by ten during each iteration of the loop. Following an execution of the described loop, the value of the hysteresis factor may be used as the physical link error alarm set threshold and a value of zero may be used as the physical link error alarm clear threshold. In other words, less than one error must be observed during the evaluation time period in order to clear the alarm signal. The evaluation time period of the described embodiment is set equal to the product of evaluation time period following the described loop and the hysteresis factor value.

Following the determination of the physical link error alarm clear threshold, physical link error alarm set threshold, and evaluation time period the real-time physical link error rate may be estimated by treating detected operational link errors (e.g., cyclic redundancy check errors such as frame check sequence errors) as physical link errors. According to the described embodiment of the present invention, this substitution may be performed if the transmission bit rate is sufficiently high in relation to the specified error rate of the data link layer technology of the link being analyzed. For example, because the Ethernet standard requires an error rate of less than $10^{-8}$, the probability of an operational link error being caused by more than one physical link error is small for transmission bit rates of 10 Mbps or greater.

According to one embodiment of the present invention, over a predetermined interval of time, the total number of operational link errors is divided by the total number of possible received bits over the predetermined time interval. The result is used as an estimate of the physical link error rate. Consequently, an operational link error rate may be determined for each predetermined interval of time and used as the physical link error rate. The described technique normalizes the operational and therefore physical link error rate based on packet size and permits a single alarm set threshold (e.g., the physical link error alarm set threshold) to be used.

In yet another embodiment, the actual total number of received bits is determined over a predetermined time period by summing the number of bits for each packet received in the predetermined time period (as contrasted with approximating this total by assuming the link is 100% active as done in the embodiment previously described). The total number of operational link errors during the predetermined time period is then divided by the determined actual total number of received bits with the result being used as an estimate of the physical link error rate.

According to one embodiment of the present invention, the number of frame check sequence (FCS) errors is accumulated (e.g., using an FCS error count variable or counter) per interface and compared during an evaluation time period to physical link error alarm set and clear thresholds as previously described herein. If a determination is made that the FCS error count is greater than or equal to the physical link error alarm set threshold, an alarm signal is generated. Once the evaluation time period is complete, a comparison is made of the FCS error count and a physical link error alarm clear threshold and any physical link error alarm signal which was previously generated is cleared if a determination is made that the FCS error count is less than or equal to the physical link error alarm clear threshold. In the described embodiment, the evaluation time period is recalculated any time a parameter (e.g., a link error alarm set threshold, hysteresis factor value, or the like) is modified.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   determining an operational link error rate of a link;
   estimating a real-time physical link error rate of said link using said operational link error rate; and
   identifying a physical link error alarm set threshold, wherein
      said identifying comprises use of a hysteresis factor and said hysteresis factor is a ratio of a physical link alarm set threshold to a physical link alarm clear threshold.

2. The method of claim 1,
   wherein said link comprises a link between a first network element and a second network element of a communications network;
   wherein said method further comprises,
      detecting an operational link error on said link; and
   wherein said determining said operational link error rate is responsive to said detecting.

3. The method of claim 2, further comprising:
   transferring data on said link between said first network element and said second network element, wherein,
      said detecting, said determining, and said estimating are performed at least partially concurrently with said transferring.

4. The method of claim 3, wherein said estimating comprises:
   estimating a real-time bit error rate of said link.

5. The method of claim 3, wherein,
   said transferring data on said link between said first network element and said second network element comprises,
      transferring a plurality of data sets;
   said detecting said operational link error on said link between said first network element and said second network element comprises,
      detecting an operational link error within at least one of said plurality of data sets; and
   said estimating said real-time physical link error rate of said link comprises,
      indicating a physical link error for said at least one of said plurality of data sets.

6. The method of claim 3, further comprising:
   identifying a physical link error alarm clear threshold;
   comparing said physical link error alarm clear threshold and said real-time physical link error rate; and
   clearing an alarm signal in response to said comparing.

7. The method of claim 3, wherein said detecting comprises, performing a cyclic redundancy check on at least a portion of said data.

8. The method of claim 7, wherein,
   said transferring data on said link between said first network element and said second network element comprises,
      transferring a data frame and a frame check sequence, and
   said performing a cyclic redundancy check comprises,
      performing an operation on said data frame to generate a result, and
      comparing said result to said frame check sequence.

9. The method of claim 3, further comprising:
   comparing said physical link error alarm set threshold and said real-time physical link error rate; and
   generating an alarm signal in response to said comparing.

10. The method of claim 9, wherein said identifying further comprises:
    receiving data specifying a user-specified link error alarm set threshold and a user-specified value of said hysteresis factor;
    determining a transmission bit rate of said link; and
    generating a physical link error alarm set threshold using said user-specified link error alarm set threshold, said hysteresis factor, and said transmission bit rate of said link.

11. A machine-readable medium having a plurality of instructions executable by a machine embodied therein, wherein said plurality of instructions when executed cause said machine to perform a method comprising:
    determining an operational link error rate of a link;
    estimating a real-time physical link error rate of said link using said operational link error rate; and
    identifying a physical link error alarm set threshold, wherein
       said identifying comprises use of a hysteresis factor and said hysteresis factor is a ratio of a physical link alarm set threshold to a physical link alarm clear threshold.

12. The machine-readable medium of claim 11,
    wherein said link comprises a link between a first network element and a second network element of a communications network;
    wherein said method further comprises,
       detecting an operational link error on said link; and
    wherein said determining said operational link error rate is responsive to said detecting.

13. The machine-readable medium of claim 12, said method further comprising:
    transferring data on said link between said first network element and said second network element, wherein,
       said detecting, said determining, and said estimating are performed at least partially concurrently with said transferring.

14. The machine-readable medium of claim 13, wherein said estimating comprises:
   estimating a real-time bit error rate of said link.

15. The machine-readable medium of claim 13, wherein,
   said transferring data on said link between said first network element and said second network element comprises,
      transferring a plurality of data sets;
   said detecting said operational link error on said link between said first network element and said second network element comprises,
      detecting an operational link error within at least one of said plurality of data sets; and
   said estimating said real-time physical link error rate of said link comprises,
      indicating a physical link error for said at least one of said plurality of data sets.

16. The machine-readable medium of claim 13, said method further comprising:
   identifying a physical link error alarm clear threshold;
   comparing said physical link error alarm clear threshold and said real-time physical link error rate; and
   clearing an alarm signal in response to said comparing.

17. The machine-readable medium of claim 13, wherein said detecting comprises:
   performing a cyclic redundancy check on at least a portion of said data.

18. The machine-readable medium of claim 17, wherein,
   said transferring data on said link between said first network element and said second network element comprises,
      transferring a data frame and a frame check sequence, and
   said performing a cyclic redundancy check comprises,
      performing an operation on said data frame to generate a result, and
      comparing said result to said frame check sequence.

19. The machine-readable medium of claim 13, said method further comprising:
   comparing said physical link error alarm set threshold and said real-time physical link error rate; and
   generating an alarm signal in response to said comparing.

20. The machine-readable medium of claim 19, wherein said identifying further comprises:
   receiving data specifying a user-specified link error alarm set threshold and a user-specified value of said hysteresis factor,
   determining a transmission bit rate of said link; and
   generating a physical link error alarm set threshold using said user-specified link error alarm set threshold, said hysteresis factor, and said transmission bit rate of said link.

21. An apparatus comprising:
   a monitoring subsystem to determine an operational link error rate of a link and to estimate a real-time physical link error rate of said link using said operational link error rate and to identify a physical link error alarm set threshold, wherein
      said identifying comprises use of a hysteresis factor and said hysteresis factor is a ratio of a physical link alarm set threshold to a physical link alarm clear threshold; and
   an alarm subsystem to generate an alarm signal in response to a comparison of said real-time physical link error rate and said physical link error alarm set threshold.

22. The apparatus of claim 21, wherein said alarm subsystem comprises:
   an alarm subsystem to clear said alarm signal in response to a comparison of said real-time physical link error rate and a physical link error alarm clear threshold.

23. The apparatus of claim 21, wherein said monitoring subsystem comprises:
   a monitoring subsystem to detect an operational link error on said link.

24. The apparatus of claim 23, wherein
   said link comprises a link between a first network element and a second network element of a communications network; and
   said monitoring subsystem comprises
      a monitoring subsystem to determine said operational link error rate of said link and to estimate said real-time physical link error rate of said link using said operational link error rate at least partially concurrently with a transfer of data between said first network element and said second network element on said link.

25. The apparatus of claim 24, wherein said monitoring subsystem to detect said operational link error on said link comprises:
   a monitoring subsystem to perform a cyclic redundancy check on at least a portion of said data.

26. The apparatus of claim 24, wherein said cyclic redundancy check comprises a frame check sequence check.

27. A method comprising:
   determining an operational link error rate of a link;
   determining an evaluation time period of the link; and
   estimating a real-time physical link error rate of said link
      bfy employing both said operational link error rate and said evaluation time period;
      said evaluation time period is approximated by dividing the value of a hysteresis factor, defined as a ratio of a physical link alarm set threshold to a physical link alarm clear threshold, by the product of a link error alarm set threshold and the transmission bit rate of said link.

28. The method of claim 27,
   wherein said link comprises a link between a first network element and a second network element of a communications network;
   wherein said method further comprises, detecting an operational link error on said link; and
   wherein said determining said operational link error rate is responsive to said detecting.

29. A method for identifying a physical link error alarm set threshold comprising:
   receiving data specifying a user-specified link error alarm set threshold and a user-specified hysteresis factor, wherein
      said user-specified hysteresis factor is a ratio of a physical link alarm set threshold to a physical link alarm clear threshold;
   determining a transmission bit rate of said link; and
   generating the physical link error alarm set threshold using said user-specified link error alarm set threshold, said hysteresis factor, and said transmission bit rate of said link.

* * * * *